US007600465B2

(12) United States Patent
Scharp

(10) Patent No.: US 7,600,465 B2
(45) Date of Patent: Oct. 13, 2009

(54) PISTON FOR AN INTERNAL COMBUSTION ENGINE

(75) Inventor: Rainer Scharp, Vaihingen (DE)

(73) Assignee: Mahle International GmbH, Stuttgart (DE)

( * ) Notice: Subject to any disclaimer, the term of this patent is extended or adjusted under 35 U.S.C. 154(b) by 276 days.

(21) Appl. No.: 11/791,898

(22) PCT Filed: Nov. 28, 2005

(86) PCT No.: PCT/DE2005/002140

§ 371 (c)(1),
(2), (4) Date: Jul. 10, 2007

(87) PCT Pub. No.: WO2006/058521

PCT Pub. Date: Jun. 8, 2006

(65) Prior Publication Data

US 2008/0134876 A1 Jun. 12, 2008

(30) Foreign Application Priority Data

Nov. 30, 2004 (DE) ........................ 10 2004 057 559

(51) Int. Cl.
*F02F 3/18* (2006.01)
*F16J 1/00* (2006.01)

(52) U.S. Cl. ............................................ 92/186; 92/216

(58) Field of Classification Search .................... 92/176, 92/186, 216, 217, 220
See application file for complete search history.

(56) References Cited

U.S. PATENT DOCUMENTS

| | | | | |
|---|---|---|---|---|
| 4,375,782 | A | 3/1983 | Schieber | |
| 4,488,522 | A | 12/1984 | Jones | |
| 6,003,479 | A * | 12/1999 | Evans | 92/186 |
| 7,308,850 | B2 * | 12/2007 | Scharp | 92/186 |
| 2006/0243131 | A1 | 11/2006 | Scharp | |

FOREIGN PATENT DOCUMENTS

| | | | |
|---|---|---|---|
| DE | 722 1644 | | 8/1972 |
| DE | 123 962 | | 1/1977 |
| DE | 27 36 815 | C2 | 3/1978 |
| DE | 29 14 456 | | 10/1980 |
| DE | 29 16 441 | | 11/1980 |
| DE | 32 31 998 | C2 | 3/1983 |
| DE | 37 19 469 | A1 | 12/1988 |
| DE | 103 49 291 | A1 | 4/2005 |
| EP | 0 178 747 | A1 | 4/1986 |

OTHER PUBLICATIONS

International Search Report.

* cited by examiner

*Primary Examiner*—Thomas E Lazo
(74) *Attorney, Agent, or Firm*—Collard & Roe, P.C.

(57) ABSTRACT

Disclosed is a piston (1) for a combustion engine, comprising an annular grooved reinforcement (4) that is screwed onto an externally threaded (13) collar (12) located in the piston head area via an internal thread (19) which is mounted on the inside of the grooved reinforcement (4). The grooved reinforcement (4) blocks a recess (14) so as to form an annular, closed cooling duct (21). In order to provide the screwed connection between the collar (12) and the grooved reinforcement (4) with sufficient stability, a radially outward area of the collar (12) is equipped with a bend that points towards the hub. Furthermore, the collar (12) is embodied in an elastically resilient manner so as to bend in the direction of the piston head when the grooved reinforcement is screwed in, thus prestressing the screwed connection.

6 Claims, 2 Drawing Sheets

PISTON FOR AN INTERNAL COMBUSTION ENGINE

CROSS REFERENCE TO RELATED APPLICATIONS

Applicant claims priority under 35 U.S.C. §119 of German Application No. 10 2004 057 559.2 filed Nov. 30, 2004. Applicant also claims priority under 35 U.S.C. §365 of PCT/DE2005/002140 filed Nov. 28, 2005. The international application under PCT article 21(2) was not published in English.

The invention relates to a piston for an internal combustion engine, in accordance with the preamble of claim 1.

A piston for an internal combustion engine is known from the patent DD 123 962; it consists of a piston base body and a ring-shaped groove reinforcement screwed onto the piston base body in the region of the piston crown. In this connection, the groove reinforcement encloses a recess formed into the piston base body, and thereby creates a ring-shaped, closed cooling channel. On the side of the piston base body, there is the thread onto which the groove reinforcement is screwed on, on the radial outside of a collar formed onto the outside of the piston close to the piston crown, which collar, however, has a radial dimension that is so short that it has no elastic resilience of any kind. This brings with it the disadvantage that no bias that strengthens the screw connection can be exerted onto this connection.

It is the task of the invention to avoid this disadvantage of the state of the art.

This task is accomplished with the characteristics standing in the characterizing part of the main claim. Practical embodiments of the invention are the object of the dependent claims.

Figure 1:
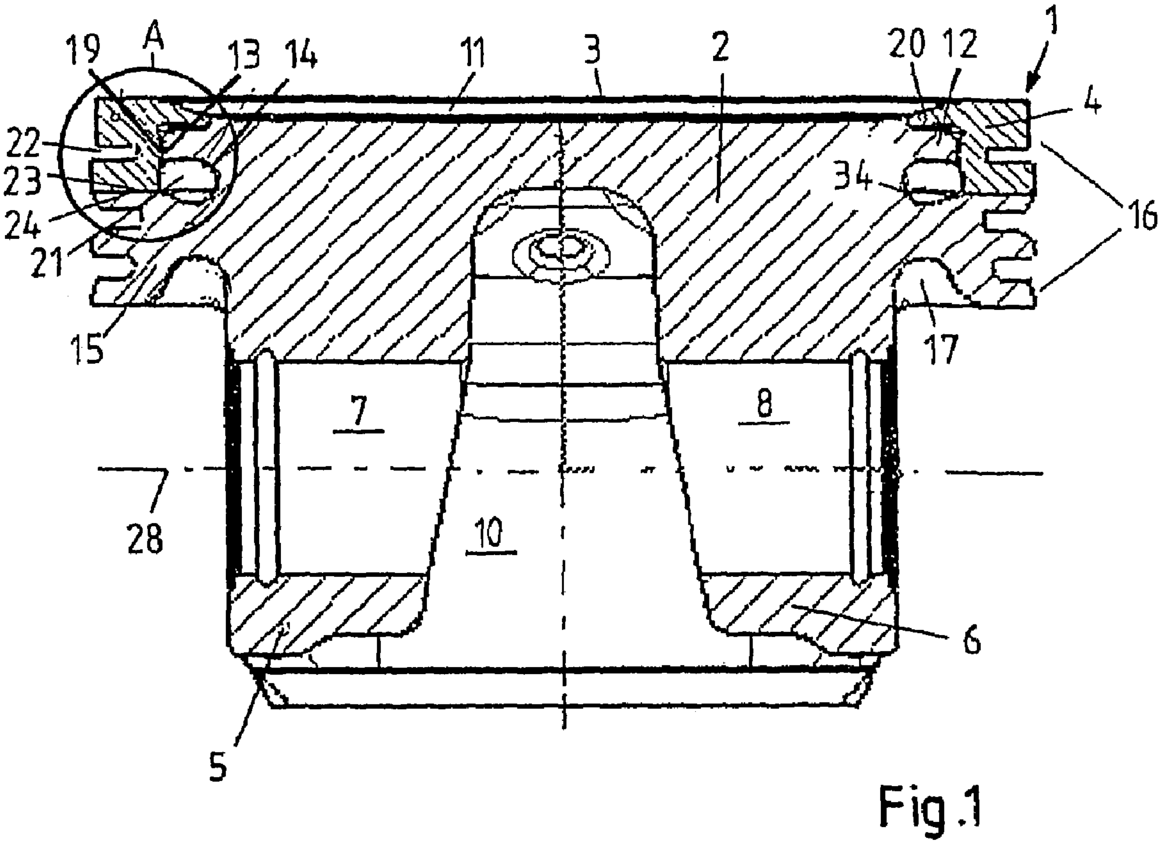
Figure 2:
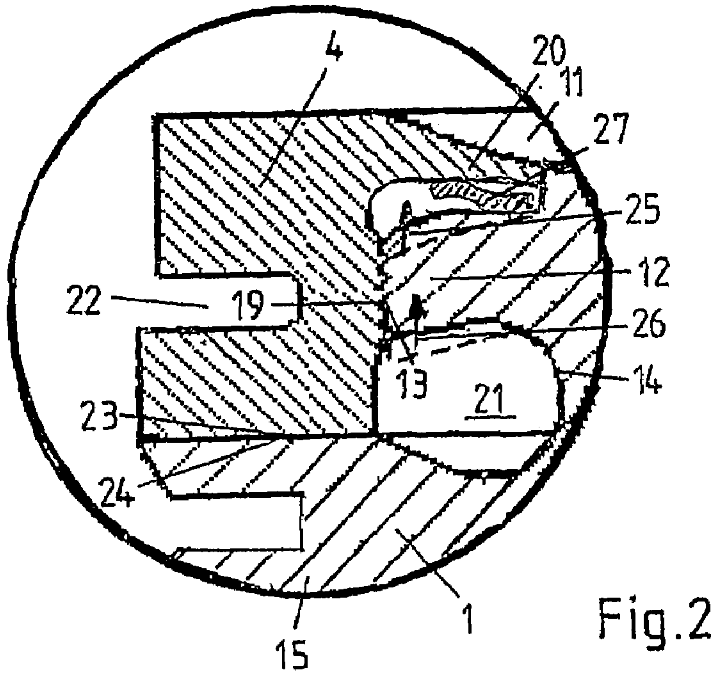
Figure 3:
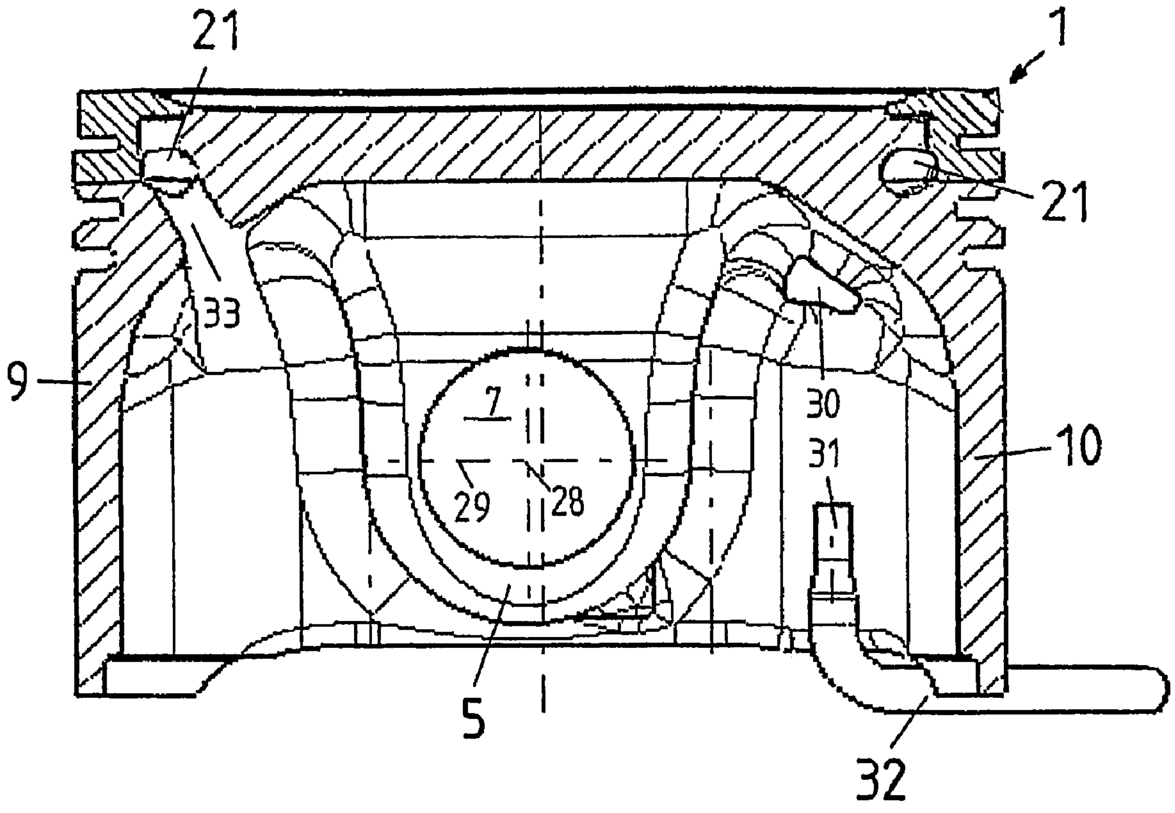

An exemplary embodiment of the invention will be described below, using the drawings. These show:

FIG. 1 a section through the piston according to the invention along the longitudinal axis of the pin, FIG. 2 an enlarged representation of the region A from FIG. 1, in which a groove reinforcement according to the invention is shown in detail, and FIG. 3 a section through the piston along a line that lies perpendicular to the longitudinal axis of the pin.

FIG. 1 shows a piston 1, in section, consisting of a piston base body 2 and a ring-shaped groove reinforcement 4 that is screwed onto the piston base body 2 in the region of the piston crown 3.

The piston base body 2 has two pin bosses 5 and 6 on the underside facing away from the piston crown 3, in which there is a pin bore 7 and 8 for accommodating a piston pin, not shown in the figures, in each instance. As particularly shown in FIG. 3, the pin bosses 5, 6 are connected on both sides with skirt elements 9, 10, of which the skirt element 10 is shown in a top view in FIG. 1.

The piston crown 3 has a combustion bowl 11 configured in flat manner. A circumferential collar 12 that is at least approximately rectangular in cross-section and points radially outward is formed onto the radial outside of the piston 1 in the region on the piston crown side, which collar carries a circumferential thread 13 radially on the outside, and is followed by a circumferential recess 14 on the pin boss side. On the pin boss side, the recess 14 is followed by a circumferential projection 15 that points radially outward, into which projection part of the recess 14 is formed on the piston crown side, which part carries the lower part of the ring belt 16 radially on the outside, and which part has a cooling channel 17, which is open in the direction of the pin bosses 5, 6, on the pin boss side.

As also shown in FIG. 2, the ring-shaped groove reinforcement 4 is screwed onto the thread 13 of the collar 12 by way of a thread 19 that lies radially on the inside in the groove reinforcement 4. The groove reinforcement 4 has a circumferential projection 20 that points radially inward and is nose-shaped in cross-section, the underside of which comes to lie on the top of the collar 12 either directly, or, as will be explained in greater detail below, by way of a sealing element 27, when the groove reinforcement 4 is screwed onto the piston 1. In this connection, the radially outer delimitation of the combustion bowl 11 is formed by the upper part of the projection 20, which projects beyond the piston crown 3.

Furthermore, the groove reinforcement 4 screwed onto the piston 1 closes off the recess 14 and thereby forms a closed cooling channel 21, which is connected with the interior region of the piston 1 by way of inflow and outflow openings 30, 33, which will be explained in greater detail below.

Radially on the outside, a compression ring groove 22 is formed into the groove reinforcement 4. On the pin boss side, the groove reinforcement 4 has a level, ring-shaped contact surface 23, which makes contact with a ring-shaped contact surface 24, shaped in similar manner, disposed on the projection 15 on the piston crown side, when the groove reinforcement 4 is screwed onto the piston 1.

The piston base body 2 consists of an aluminum/silicon alloy having a maximal silicon content of 15%, whereby the piston base body 2 is produced using a forging method or a casting method. The groove reinforcement 4 consists of an aluminum alloy that contains 15% to 26% silicon in order to increase its friction-wear resistance, and 2.5% to 7% copper in order to increase its resistance to deformations during engine operation. A further increase in the friction-wear resistance of the groove reinforcement 4 can be achieved if silicon carbide particles are mixed into the alloy. The groove reinforcement 4 is produced using a casting method, after which the groove reinforcement 4 is post-compressed in order to reduce its porosity and thereby optimize its mechanical properties, by way of the method of hot isostatic pressing (HIP).

FIG. 2 shows an enlarged representation of the region marked as A in FIG. 1, which shows the assembled state in which the groove reinforcement 4 is screwed tightly onto the piston. The shape of the collar 12 in the relaxed state, i.e. when the groove reinforcement 4 has not yet been screwed tightly onto the collar 12, is shown with a broken line in FIG. 2. It can be seen that the collar 12 has a bend in the pin boss direction radially on the outside in this connection. When the groove reinforcement 4 is screwed tightly onto the collar 12, the collar 12 is bent back in the direction of the piston crown 3 and biased, as indicated by means of the arrows 25 and 26, so that a bias is exerted on the screw connection between collar 12 and groove reinforcement 4, by the collar 12, which bias guarantees sufficient strength of this screw connection.

A ring-shaped sealing element 27 of, spring steel is disposed between the projection 20 of the groove reinforcement 4 that lies radially on the inside and the collar 12, which element seals off the cooling channel 21 from combustion gases that act on the piston crown 1, and has the shape of a plate edge. In FIG. 2, which shows the assembled final state of the piston 1, the sealing element 27 is shown in the biased state. In the relaxed state, it has a greater waviness, viewed in cross-section, but when the groove reinforcement 4 is screwed onto the collar 12, it is compressed into the shape shown in FIG. 2, and flattened.

FIG. 3 shows a section through the piston 1 along a line 29 that lies perpendicular to the longitudinal axis 28 of the pin. An oil inflow opening 30 can be seen, by way of which oil sprayed out by an injection nozzle 31 is introduced into the closed cooling channel 21. The injection nozzle 31 is attached to an oil inflow line 32 that is disposed in the cylinder block in stationary manner and assumes the position, relative to the piston 1, shown in FIG. 3 only and every time when the piston 1 reaches the lower reversal point in engine operation. Only then can oil be introduced into the cooling channel 21 by way of the oil inflow opening 30. Furthermore, an oil outflow opening 33 is shown in FIG. 3, by way of which the oil leaves the cooling channel 21 again after cooling the piston 1.

REFERENCE SYMBOL LIST

A region
1 piston
2 piston base body
3 piston crown
4 groove reinforcement
5, 6 pin boss
7, 8 pin bore
9, 10 skirt element
11 combustion bowl
12 collar
13 thread, outside thread
14 recess
15 projection
16 ring belt
17 open cooling channel
19 thread, inside thread
20 projection
21 closed cooling channel
22 compression ring groove
23, 24 contact surface
25, 26 arrow
27 sealing element
28 longitudinal axis of pin
29 line
30 oil inflow opening
31 injection nozzle
32 oil inflow line
33 oil outflow opening
34 region

The invention claimed is:

1. Piston (1) for an internal combustion engine, consisting of a piston base body (2)
having a piston crown (3),
having pin bosses (5, 6) disposed on the side of the piston (1) facing away from the piston crown (3),
having pin bores (7, 8) formed into the pin bosses (5, 6),
having skirt elements (9, 10) that connect the pin bosses (5, 6) with one another,
having a circumferential region (34) that proceeds from the piston crown (3), is disposed radially on the outside, points axially in the pin boss direction, having
a circumferential collar (12) that is disposed at a slight axial distance from the piston crown (3), formed onto the radial outside of the piston (1), points radially outward, is at least approximately rectangular in cross-section, which collar has a circumferential outside thread (13) radially on the outside, the diameter of which is less than the piston diameter, and furthermore having
a recess (14) that follows it on the piston crown side, and
furthermore consisting of a ring-shaped groove reinforcement (4) having a circumferential projection (20) that follows its face and points radially inward, which is followed, on the pin boss side, by an inside thread (19) by way of which the groove reinforcement (4) is screwed onto the outside thread (13), whereby a contact surface (23) of the groove reinforcement (4) that lies on the pin boss side makes contact with a contact surface (24) that delimits the region (34) on the pin boss side and thereby closes off the recess (14) to form a ring-shaped, closed cooling channel (21), and whereby the ring belt (16) of the piston (1) is disposed partly on the radial outside of the groove reinforcement (4) and partly on the radial outside of the piston (1) that follows it, on the pin boss side, wherein the collar (12) has a bend in the pin boss direction radially on the outside, and a radial width that is sufficient for an elastic resilience in the axial direction.

2. Piston (1) for an internal combustion engine according to claim 1, wherein the groove reinforcement (4) projects beyond the piston crown (3) in the axial direction and thereby forms the radially outer delimitation of a combustion bowl (11).

3. Piston (1) for an internal combustion engine according to claim 1, wherein a ring-shaped, elastically resilient sealing element (27) of spring steel is disposed between the projection (20) of the groove reinforcement (4) and the collar (12), which element has the shape of a plate edge.

4. Piston (1) for an internal combustion engine according to claim 1, wherein the piston base body (2) consists of an aluminum/silicon alloy having a maximal silicon content of 15%.

5. Piston (1) for an internal combustion engine according to claim 1, wherein the groove reinforcement (4) consists of an aluminum alloy having 15% to 26% silicon and 2.5% to 7% copper.

6. Piston (1) for an internal combustion engine according to claim 5, wherein silicon carbide particles are mixed into the aluminum alloy.

* * * * *